Nov. 29, 1966  J. V. SCHWEPPE  3,288,581

METHOD FOR PRODUCING FIBERS

Filed Oct. 28, 1963

INVENTOR.
JOHN V. SCHWEPPE
BY *Oscar L. Spencer*
ATTORNEY

United States Patent Office 3,288,581
Patented Nov. 29, 1966

3,288,581
METHOD FOR PRODUCING FIBERS
John V. Schweppe, Shelby, N.C., assignor to Pittsburgh Plate Glass Company, Pittsburgh, Pa., a corporation of Pennsylvania
Filed Oct. 28, 1963, Ser. No. 319,488
2 Claims. (Cl. 65—2)

This application is a continuation-in-part of copending application Serial No. 67,120, filed November 3, 1960, now abandoned.

The present invention relates to a method for producing thermoplastic, continuous filament fibers and it has particular relation to a method for producing continuous filament glass fibers.

Continuous filament glass fibers have been produced according to the process shown in United States Patent No. 2,291,289. In this process, molten glass is contained in a platinum alloy, trough-like chamber known as a bushing. The bushing is electrically heated by passing electric current through it and the glass therein is heated by contact with the hot bushing. The bushing contains a plurality of orifices in its bottom with cylindrical, hollow tips projecting downwardly from the bottom of the bushing in line with the orifices to deliver the glass. The glass is pulled from the tips into fine, continuous filaments by suitable means such as a winder. The filaments are passed over a gathering guide and grouped into a strand before being collected on the winder.

The critical point in the fiber forming process is where the fibers are pulled from the bushing tips and stretched out exceedingly rapidly to form the very fine filaments. The molden glass forms as an inverted cone hanging from the bushing tip, and the filament is pulled from the apex of the cone at a rate of about 2 to 3 miles per minute. The diameter of the cone of glass at its base is of the order of 0.075 inch, and the diameter of the filaments pulled from the cone is of the order of 5 to 20 microns. It is calculated that the acceleration of the glass as it passes from the base of the cone to the apex of the cone and away therefrom is somewhere in the neighborhood of 240,000 G's within a fraction of a second and within the space of a fraction of an inch.

In order to accomplish this, it has been found to be necessary to control the temperature of the glass in the cone and adjacent to it very carefully. The glass is heated in the bushing to a temperature at which it is quite fluid in order to insure that the glass is in a highly refined state. At this temperature it is much too fluid for fiber forming and it must be cooled by the time it reaches the cones so that it is viscous enough for fiber forming. Some cooling is accomplished as the glass passes through the bushing tips and the glass is cooled to fiber drawing temperature as it is exposed to the atmosphere while suspended in the cone.

Accelerated cooling of the glass in the cone has been accomplished by directing a continuous flow of cool air directly against the cones and bushing tips as shown in the above-mentioned patent. This cooling method is satisfactory when there are only two rows of tips. Substantially the same method was employed for a bushing having several rows of tips; however, it was necessary to arrange successive rows of tips at different levels. Such arrangement is illustrated in United States Patent No. 2,335,135. Because of the geometry involved, the different level tip arrangement can only produce variations in fiber diameter. However, uniformity of fiber diameter is desirable.

The glass fiber art has now moved to the point where there are 200, 400 and even 600 orifices and tips in a single bushing, with the tips at the same level, generally in a horizontal plane. The bushing development has necessitated that the tips be arranged in more than two rows, for example, from 4 to 20 or more parallel rows extending in the long dimension of the bushing and having 30 to 50 or more tips in each row. Directly impinging air against the tips and cones is not satisfactory for cooling the modern multiple row bushing. The outside rows of tips and cones are not only cooled more than the inside rows which uneven cooling results in erratic performance of the fiber forming process, but direct air impingement against tips or causes disruption in the fiber forming process.

It has also been proposed in United States Patent No. 2,908,036 that cooled fin-like members be mounted between the rows of tips. These fins receive heat radiated from the cones of glass, and the heat is passed by conduction along the length of the fins to a cooled supporting member for the fins located at one side of the bushing. The fins do not provide uniform cooling, and require very careful mounting to avoid touching the bushing. Frequently, a fin will accidentally contact a hot bushing tip and the hot tip is deformed. When a tip is deformed, the bushing is no longer suitable for use and must be removed, because one damaged tip prevents continuous fiber forming. Bushings cannot be satisfactorily repaired and therefore the deformation of a tip destroys the bushing. The destruction of a bushing and the production time lost in replacing the bushing is extremely costly and undesirable. The fins require the spacing between the rows of tips to be increased to permit them to be mounted between the tips and this increases the size of the bushing required. This is expensive and also imposes more severe angles on the outside filaments as they pass over the gathering guide. The cooling action of the fins is not uniform over a period of time because their efficiency changes daily in that they become dirty and a scale forms thereon. Frequent removal and cleaning is necessary, further disrupting the continuity of the process and adding to the production costs.

It is an object of this invention to provide an improved method of forming continuous, thermoplastic filaments, particularly strands of multi-filament glass fibers where the filaments are drawn from a bushing having more than two rows of orifices, for example, 4 to 20 or more rows of orifices, the tips of which are in a single plane and arranged, when in use, at the same, generally horizontal, level. It is a further object of the invention to provide an improved method of stabilizing the fiber forming conditions, particularly the temperature of the bushing tips and cones of glass suspended therefrom in a continuous filament glass fiber process. It is also an object of this invention to accomplish the stabilization of the fiber forming process without the use of fins. It is a further object of the invention to provide controlled cooling of all of the tips and cones of glass suspended therefrom in a fiber forming process and to control the atmospheric conditions in the areas of the tips and cones of glass issuing from the tips.

These and other objects of the invention are accomplished by initially directing individual streams of air between the rows of tips and cones in such a manner and at such a velocity to not directly impinge upon a tip or cone. The air is directed from short nozzles extending from a header and cooled support therefor which are mounted to one side of the bushing at about the level of the tips and cones. The manner of accomplishing the objects of the invention is further described in conjunction with the drawing in which.

Figure 1:
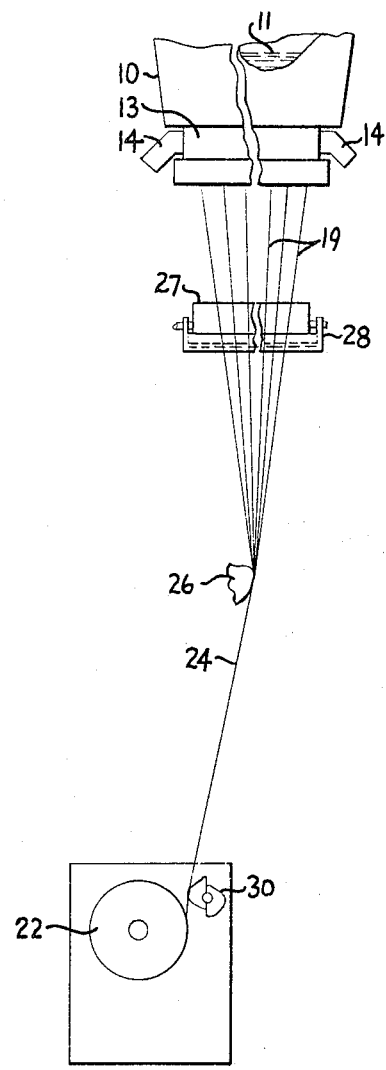
FIG. 1 is an elevation of a glass fiber forming process utilizing the present invention.

In FIG. 1 of the drawing there is shown a glass melting furnace or forehearth 10 containing a supply of molten glass 11 and a bushing 13 attached to the bottom of the furnace. The bushing is usually made of a platinum-rhodium alloy containing approximately 90 percent platinum, and it is trough-like in shape. The bushing is heated by electric current which is passed through terminals 14 connected to its ends. The bottom face of the bushing is flat and planar and is provided with a series of orifices with a hollow tip 15 extending downwardly at each orifice. The tips are of substantially the same length, so as to be in the same plane, and are arranged in a number of longitudinal rows. There may be 4 to 20 or more rows having 30 to 50 or more tips in each row, so that the total number of tips is 200 or more in number. The tips in each longitudinal row are aligned with the tips in adjacent rows to form transverse rows. Each tip is evenly spaced with respect to the adjacent tips.

Glass filaments 19 are pulled from cones of glass 20 which are suspended from each of the tips 15. These filaments are pulled at a very high rate of speed, i.e., 5,000 to 20,000 feet per minute, and wound on a rapidly rotating forming tube 22. The glass filaments are grouped into a strand 24 as they pass over a gathering guide 26 prior to their being wound on the forming tube 22. Usually a size made up of a liquid binder and lubricant such as a combination of starch and vegetable oil is applied to the filaments as they pass over a rotating roller 27 mounted in a container 28 holding a supply of the size. This is done prior to the time the filaments are grouped into the strand. As the strand 24 is wound on the tube 22, it is rapidly traversed along the length of the tube by means of a suitable rotating traverse mechanism 30.

Figure 2:
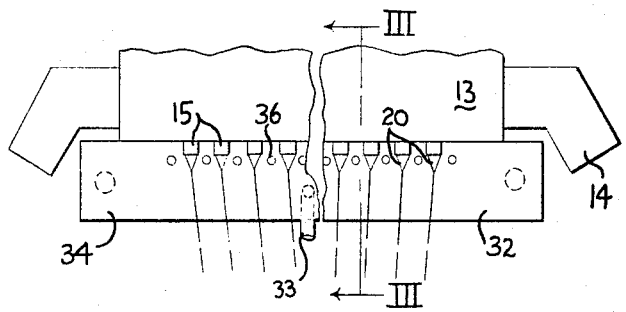
FIG. 2 is an elevation partly in section illustrating apparatus for stabilizing the fiber forming process.
Figure 3:
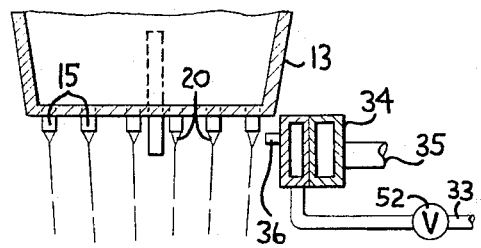
FIG. 3 is a view in section taken along lines III—III of FIG. 2.
Figure 4:
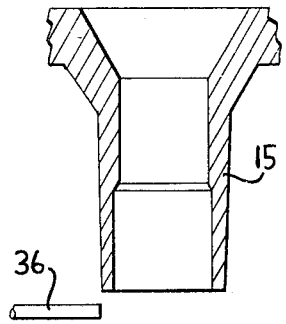
FIG. 4 is an enlarged sectional view of a tip and a nozzle, especially showing the spacial relationship therebetween.

In accordance with the present invention, an air supply header 32 is mounted below the bushing 13 and, as shown in FIGS. 2 and 3, extends along the outside rows of tips a short distance from them. The header 32 supplies air for discharge from small orifices in the inboard side of the header 32. Air is supplied to the header 32 through line 33 from a suitable source. The header 32 is mounted to the inboard side and as part of a cooled, hollow supporting member 34. The member 34 is cooled by having a cooling fluid, such as water at 80° F., pass through it by means of entering and exit conduits 35, and the cooled member 34 serves to keep the header and gas passing through it cool. The header 32 and supporting member 34 may be all one structural piece with separate passages for the gas and the cooling fluid or they may be two separate elements.

Small hypodermic needles or tubes 36 are connected to the orifices in the header 32, so as to initially direct the air between the adjacent pairs of transverse rows of tips and cones. The tubes 36 are generally horizontal with their terminal ends positioned just slightly below the level of the lower, terminal ends of the tips and are centered with respect to the spaces between the adjacent rows of tips. The tubes 36 extend only a short distance from the header 32 in a direction toward the areas between the tips and cones but do not extend between them. The length of the tubes is only that which is sufficient to give initial direction to the air and to avoid direct air impingement on any tip or cone. The diameter of the tubes may be, for example, 0.008 to 0.05 inch.

Air is directed from the tubes at a low pressure, for example, at a pressure of 2.0 to 50 inches of water. It is important that the air flow be laminar in nature, i.e., having a Reynolds number less than 2100 because turbulent air flow would permit direct air impingement on a tip or cone and disrupt the forming process. Generally, it is preferred that the Reynolds number of the air flow be less than 1000. It is important that the pressure of the air be just sufficient to initially propel the air into the zone beneath the bushing and between the tips and cones of glass, but not so great as to interrupt the fiber forming process. The projected air, being a fluid, expands to envelop the bushing tips and glass cones and absorbs heat in the forming zone. Enveloping the forming zone with air provides a substantially uniform condition at each tip and cone. Absorption of heat conditions the cones of glass and improves the process. Room temperature air may be used or cooled air may be used depending upon the conditioning desired. It is also contemplated that other cooling gases be employed such as nitrogen, carbon dioxide and sulfur dioxide gases.

In essence, the header 32 and air discharged from the tubes 36 provide a controlled atmosphere in the forming zone for the tips and cones and partially excludes the surrounding atmosphere and its random variations in temperature, turbulence and velocity. The controlled atmosphere also prevents the development of a negative pressure area under the bushing which was formerly caused by the removal of air by inspiration along the rapidly moving fibers. Negative pressure in the forming area caused a constant pulsing of air along the fiber which led to tension pulses and variations in diameter in the fiber being drawn. By uniformly feeding air into this normally negative pressure zone, laminar flow of air along the fiber path results and pulsing is reduced. Fibers having a constant diameter along their length are thus formed. When operating according to the teachings of this invention, foreign material normally present in the atmosphere around the forming area is now substantially excluded from the area just beneath the bushing. This foreign material when inspired often caused fiber breakage, particularly at the gathering guide.

In accordance with the inventive concept, it is possible to modify the particular arrangement shown and illustrated. As for example, the air may be directed from opposite sides of the bushing. It is important in any modification to provide laminar air flow and to initially direct the air, so that there is no direct impingement on a tip or a cone.

It can be seen from the above description of the invention that a simple method of controlling the atmospheric conditions in the critical area surrounding the tips and cones of glass suspended from the tips has been provided. Direct impingement of the conditioning air on any tip or cone is avoided. A controlled method of stabilizing the fiber forming conditions in the critical forming area has been achieved. The method of this invention eliminates the use of fins extending between the rows of bushing tips and this is free from the maintenance problems that have been encountered as a result of the use of fins. The present invention has permitted the continuous operation of the fiber forming process with an increased degree of efficiency and without the problems encountered by the prior art.

Several other advantages can be realized from the present invention. Suitable flow control means 52 can be inserted in the fluid supply lines to increase or decrease the rate of flow of the cooling gases either before, during or after the fiber forming operation. Adjustments in air flow can be made from one bushing position to another to obtain the best operating conditions for each bushing in a forehearth independent of the other bushings. Yardage compensation can be accomplished during a fiber forming run by constantly increasing the rate of flow of cooling gas from the tubes as the fibers are wound on a forming tube rotating at a constant r.p.m. to form a package of constantly increasing outside diameter. This can be done by means of a suitable stepping switch (not shown) connected with a clock mechanism (not shown) for controlling the opening in the flow control means. The flow of glass between fiber forming runs can be decreased by greatly increasing the flow of cooling gases during the interval between forming runs. This helps to minimize glass waste. Also, the glass at start-up is thus cooler and this permits the operator to handle it without burning his hands. When the new forming run is started, the air flow is again reduced to that rate which has been found optimum for the particular bushing.

Although the present invention has been described with respect to specific details of certain embodiments thereof, it is not intended that such details serve as limitations on the invention except insofar as set forth in the accompanying claims.

I claim:

1. A method of forming thermoplastic fibers which comprises drawing a plurality of filaments from streams of the thermoplastic material passing through orifices aligned in a plurality of rows in the flat planar bottom of a bushing, and directing a plurality of individual streams of a cooling gas initially between the rows of filaments just below the bushing and the orifices from at least one side of the bushing, said streams of gas each having a Reynolds number less than 2100 and a pressure sufficient to initially propel the gas into and throughout the entire zone directly below the bushing avoiding direct impingement of any air stream below said bushing onto a filament providing a controlled atmosphere surrounding the orifices and the streams passing therethrough.

2. A method as recited in claim 1 wherein said fibers are glass and wherein the Reynolds number is less than 1000.

References Cited by the Examiner

UNITED STATES PATENTS

| | | | |
|---|---|---|---|
| 2,291,289 | 7/1942 | Slayter | 65—12 |
| 2,335,135 | 11/1943 | Staelin | 65—12 |
| 2,908,036 | 10/1959 | Russell | 65—12 |
| 3,068,670 | 12/1962 | Russell | 65—12 |

DONALL H. SYLVESTER, *Primary Examiner.*

S. LEON BASHORE, G. R. MYERS,
*Assistant Examiners.*